(12) United States Patent
Colliar et al.

(10) Patent No.: US 6,543,840 B2
(45) Date of Patent: Apr. 8, 2003

(54) CAB FOR AN AGRICULTURAL VEHICLE

(75) Inventors: James Colliar, Billericay (GB); Martyn J. Randall, Burnham-On-Crouch (GB); Russell W. Strong, Craftsbury Common, VT (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/954,854

(22) Filed: Sep. 18, 2001

(65) Prior Publication Data

US 2002/0079721 A1 Jun. 27, 2002

(30) Foreign Application Priority Data

Sep. 20, 2000 (GB) .............................................. 0023130

(51) Int. Cl.[7] ................................................ B62D 33/06
(52) U.S. Cl. ................................. 296/190.08; 296/205
(58) Field of Search ............................ 296/183, 190.01, 296/190.03, 190.08, 203.01, 205

(56) References Cited

U.S. PATENT DOCUMENTS

| 3,787,085 | A | * | 1/1974 | Bucher et al. ......... 296/190.03 |
| 5,820,199 | A | * | 10/1998 | Camplin et al. ............. 296/205 |
| 6,073,993 | A | * | 6/2000 | Iwatsuki et al. ............. 296/205 |
| 6,149,228 | A | * | 11/2000 | O'Neill et al. ......... 296/190.01 |
| 6,189,195 | B1 | * | 2/2001 | Canfield et al. .............. 347/22 |
| 6,325,449 | B1 | * | 12/2001 | Sorensen et al. ...... 296/190.01 |
| 6,409,254 | B2 | * | 6/2002 | Tiziano ....................... 296/205 |

FOREIGN PATENT DOCUMENTS

| DE | 3229925 | 3/1983 |
| EP | 0842842 | 5/1998 |
| GB | 1428528 | 3/1976 |
| GB | 2306921 | 5/1997 |

* cited by examiner

*Primary Examiner*—D. Glenn Dayoan
*Assistant Examiner*—Jason Morrow
(74) *Attorney, Agent, or Firm*—Larry W. Miller; John William Stader

(57) ABSTRACT

A cab is described for an agricultural vehicle having front and rear corners and two rear wheel fenders arranged one on each side at the rear of the cab. The cab comprises a frame that includes two rear support members. The rear support members having lower portions disposed at the back of the cab between the two fenders and upper portions disposed above the fenders and offset laterally outwards from the lower portions.

9 Claims, 5 Drawing Sheets

CAB FOR AN AGRICULTURAL VEHICLE

BACKGROUND OF THE INVENTION

The present invention relates to a cab for an agricultural vehicle having front and rear corners and two rear wheel fenders arranged one on each side at the rear of the cab.

U.S. Pat. No. 5,820,199 discloses a frame assembly for an operator's compartment of a construction work machine, such as an earth moving machine. The compartment has an upper roof portion, a lower base portion and first and second side support assemblies connected between the roof portion and the base portion mid-way along the length of the compartment. Each side support assembly, includes a straight part, comprised of formed tube, and a curved part, formed of a fabricated box section having several individual wall plates.

In vehicle construction, the pillars supporting the roof are often referred to as A-pillars, B-pillars and C-pillars. A-pillars are arranged at the front corners of the cab to provide strength around the front windscreen, the B-pillars are the door pillars that strengthen the frame level with the position of the driver's seat, and the C-pillars are arranged at the back of the cab and strengthen the frame of the cab around the rear window. Whereas U.S. Pat. No. 5,820,199 proposes a construction of the B-pillars that is curved to wrap around the wheel arches, in the present invention it is the C-pillars arranged at the back of the cab that are curved in this manner. Indeed, in the present invention, for a smaller cab, B-pillars are not required and the cab frame may have only A-pillars and C-pillars so that the lateral visibility is not impaired by support members.

The cab frame will normally include only two further support members disposed at the front corners of the cab and it is further preferred for these front support members and the upper portions of the rear support members to be curved to run inwards from the bottom to the top of the cab. This curving of the support members achieves improved cab strength and avoids the totally functional and utilitarian appearance of conventional cabs.

SUMMARY OF THE INVENTION

It is an object of the present invention to provide a cab for a vehicle, in particular a tractor, that is aesthetically pleasing and affords improved driver visibility.

According to the present invention, there is provided a cab for an agricultural vehicle having front and rear corners and two rear wheel fenders arranged one on each side at the rear of the cab, wherein the cab comprises a frame that includes two rear support members, the rear support members having lower portions disposed at the back of the cab between the two fenders and upper portions disposed above the fenders and offset laterally outwards from the lower portions.

Preferably, the upper portions of the rear support member are additionally offset to lie forwards of the lower portions at a distance from the rear of the cab. This allows the back window to be curved to wrap around the back of the cab and improves visibility still further. The moving of the upper portion of the C-pillar forwards has the effect of reducing the width of the doors and improves the rigidity of the cab.

It is convenient to form the rear support members from a tube that is bent, for example by hydroforming, to define a curved generally horizontal transition portion between the upper and lower portions. This is a more convenient and inexpensive manner of forming the curved support members than the assembled box sections described in the prior art reference discussed above.

Whereas in U.S. Pat. No. 5,820,199, the horizontal section of the side assembly simply wraps around the wheel arch or fender (in the prior art this is more likely to be a caterpillar track than a wheel), in the present invention, the horizontal transition section of the rear support member may additionally serve to support a window that is arranged at the rear of the cab to extend between the upper sections of the rear support members.

These and other objects, features and advantages are accomplished according to the instant invention by providing a cab for an agricultural vehicle having front and rear corners and two rear wheel fenders arranged one on each side at the rear of the cab. The cab comprises a frame that includes two rear support members. The rear support members having lower portions disposed at the back of the cab between the two fenders and upper portions disposed above the fenders and offset laterally outwards from the lower portions.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
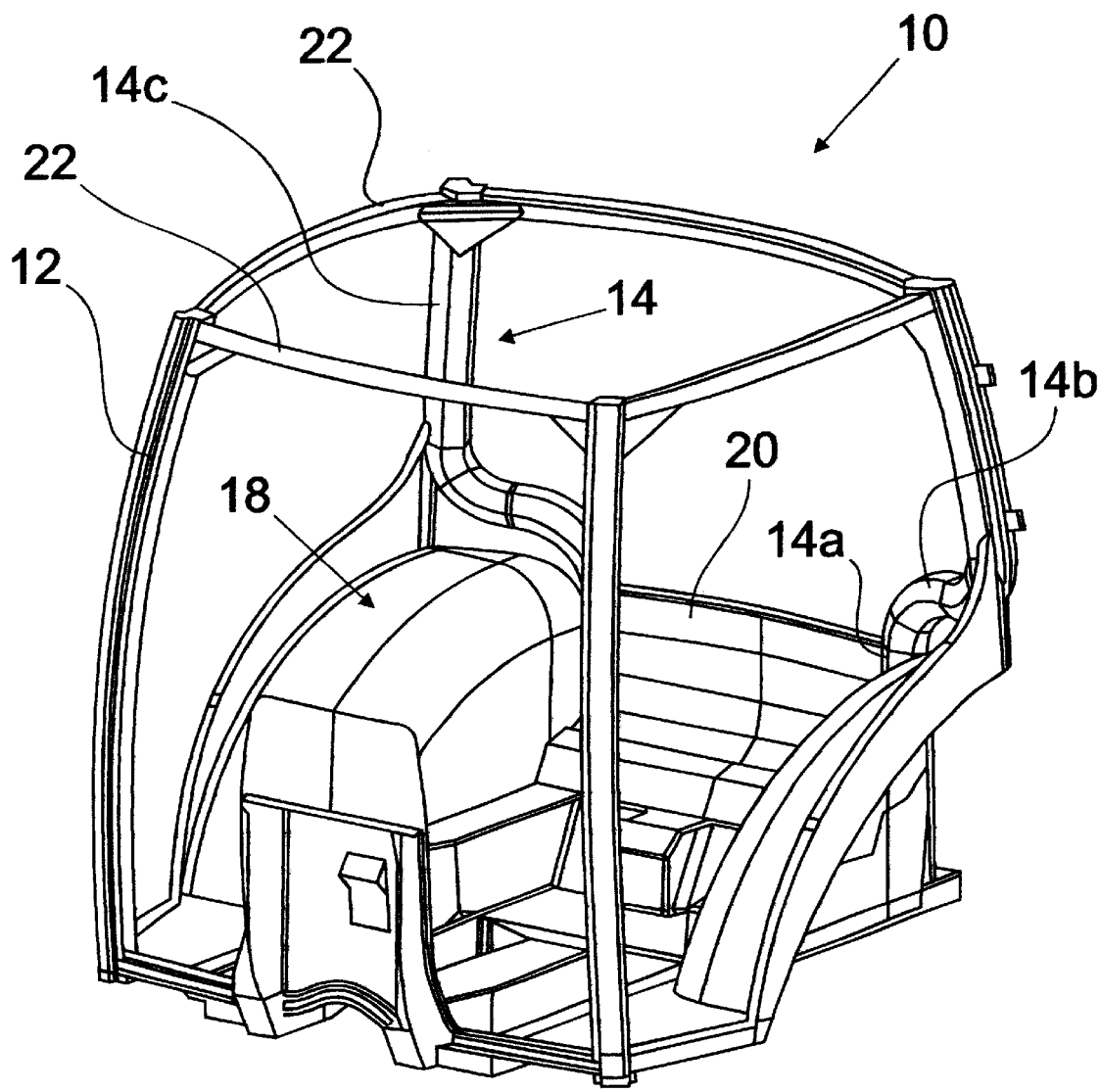
FIG. 1 is a perspective view of the frame incorporating the principles of the instant invention.
Figure 2:
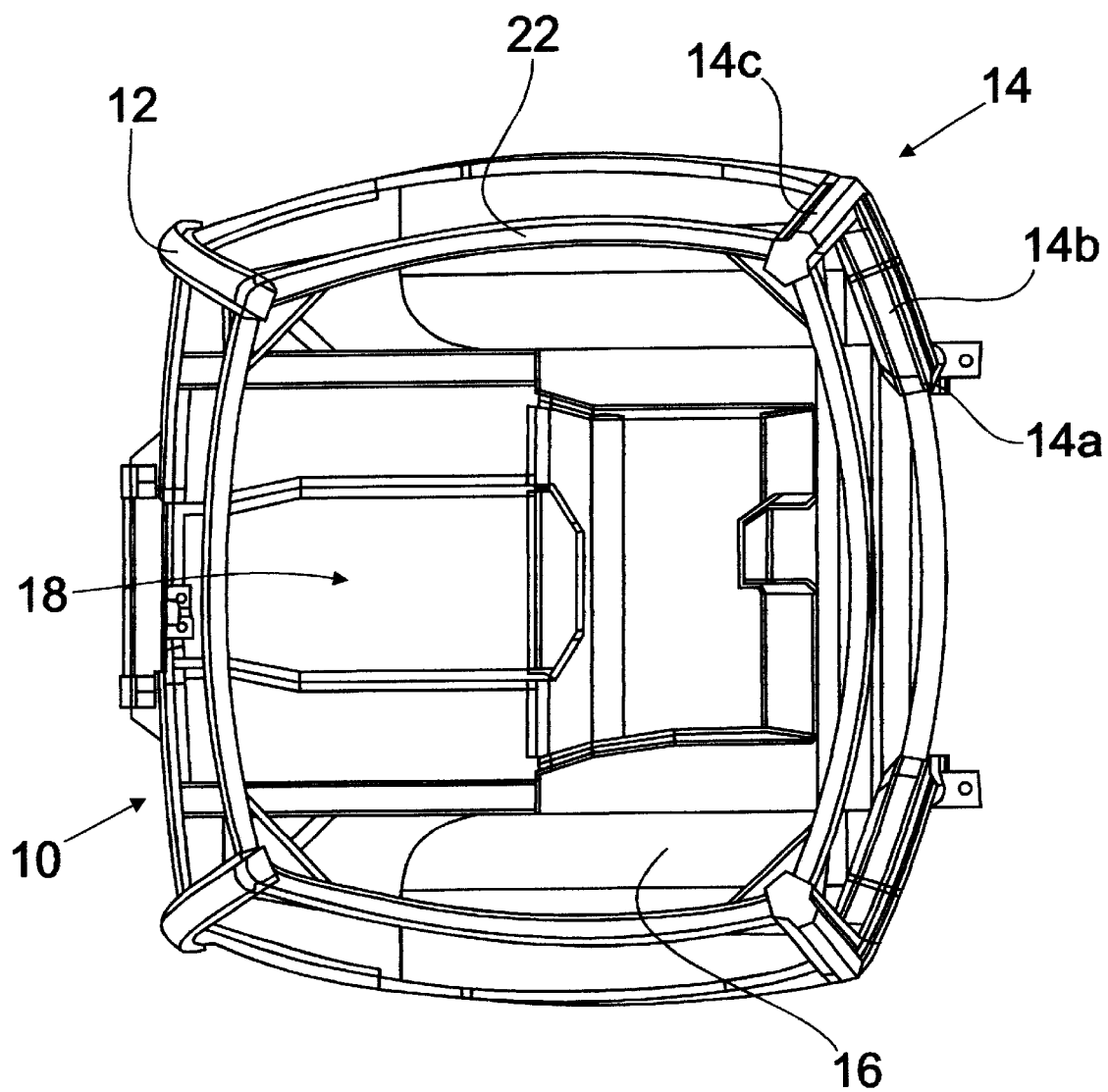
FIG. 2 is plan view from above of the cab frame shown in FIG. 1.
Figure 3:
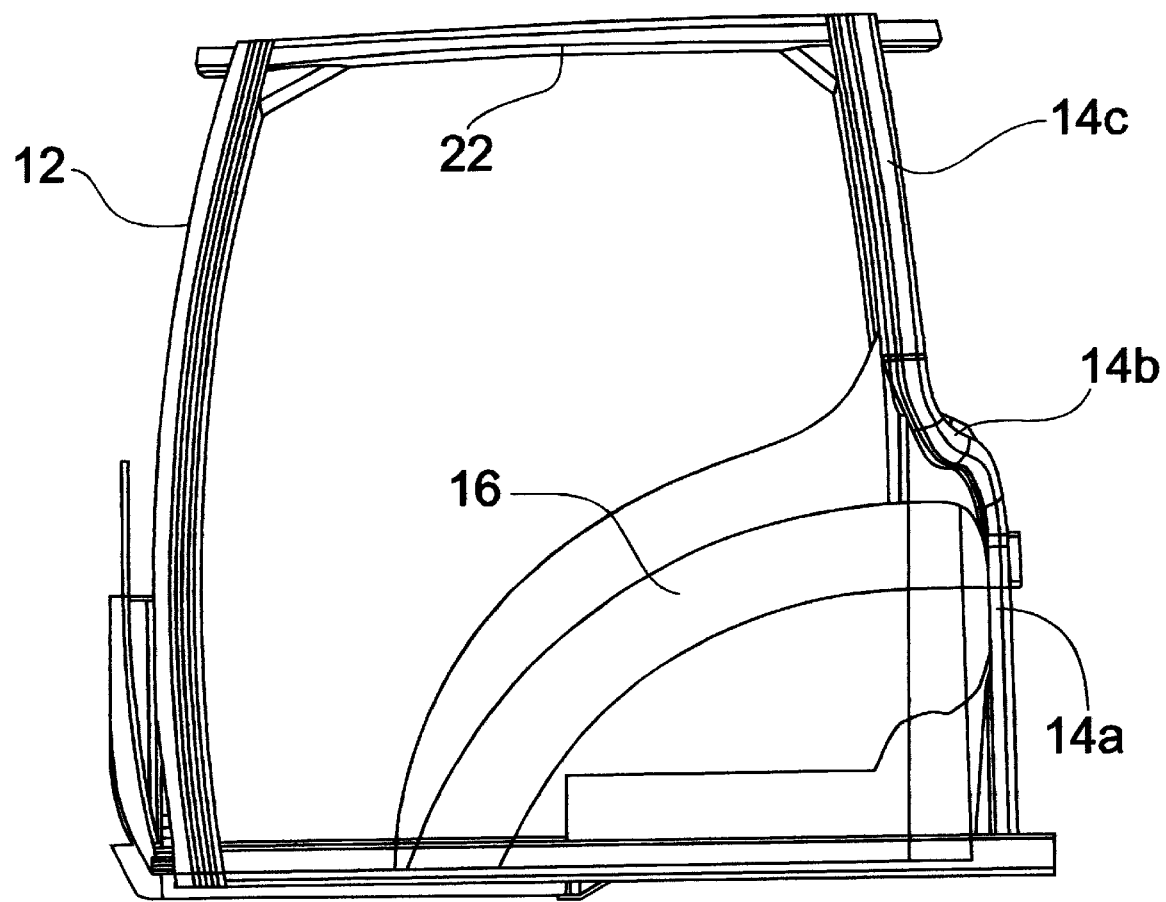
FIG. 3 is a view from the right side of the cab frame shown in FIGS. 1 and 2.
Figure 4:
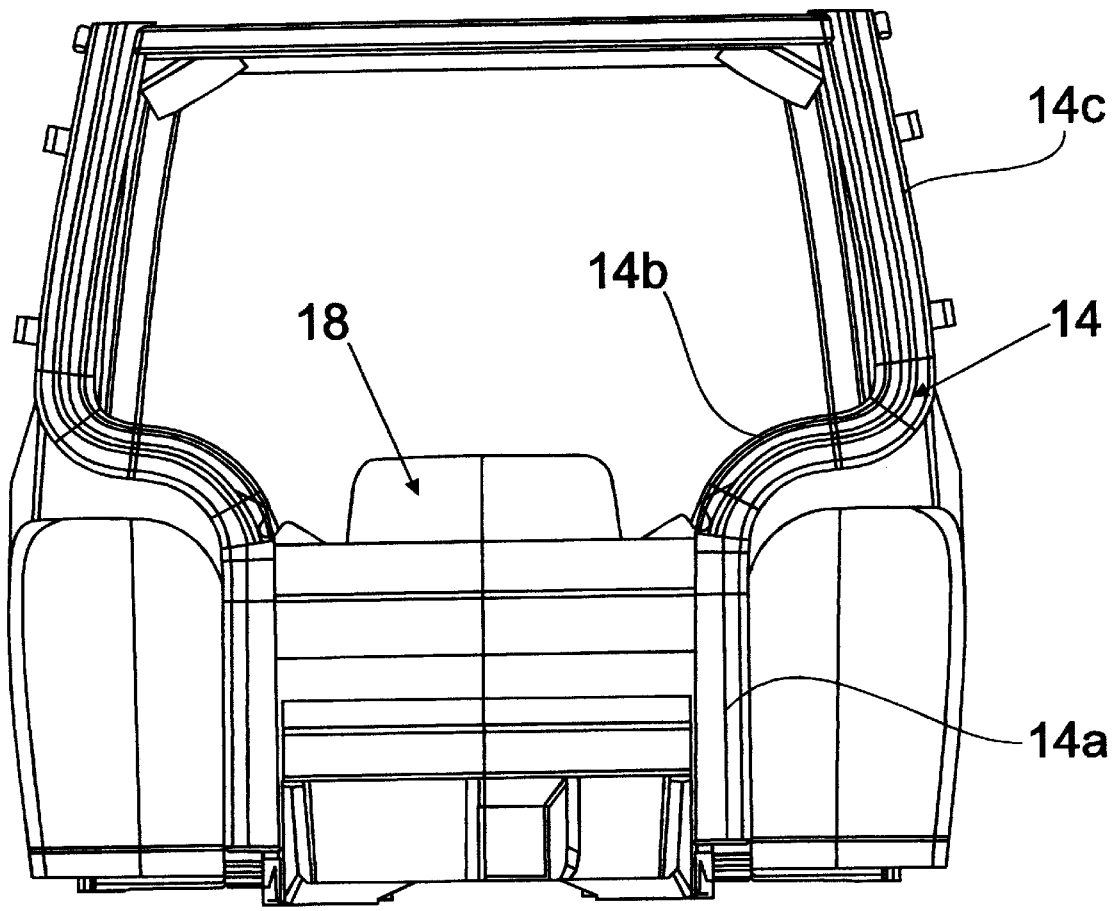
FIG. 4 is a view from the back of the cab frame shown in FIGS. 1–3.
Figure 5:
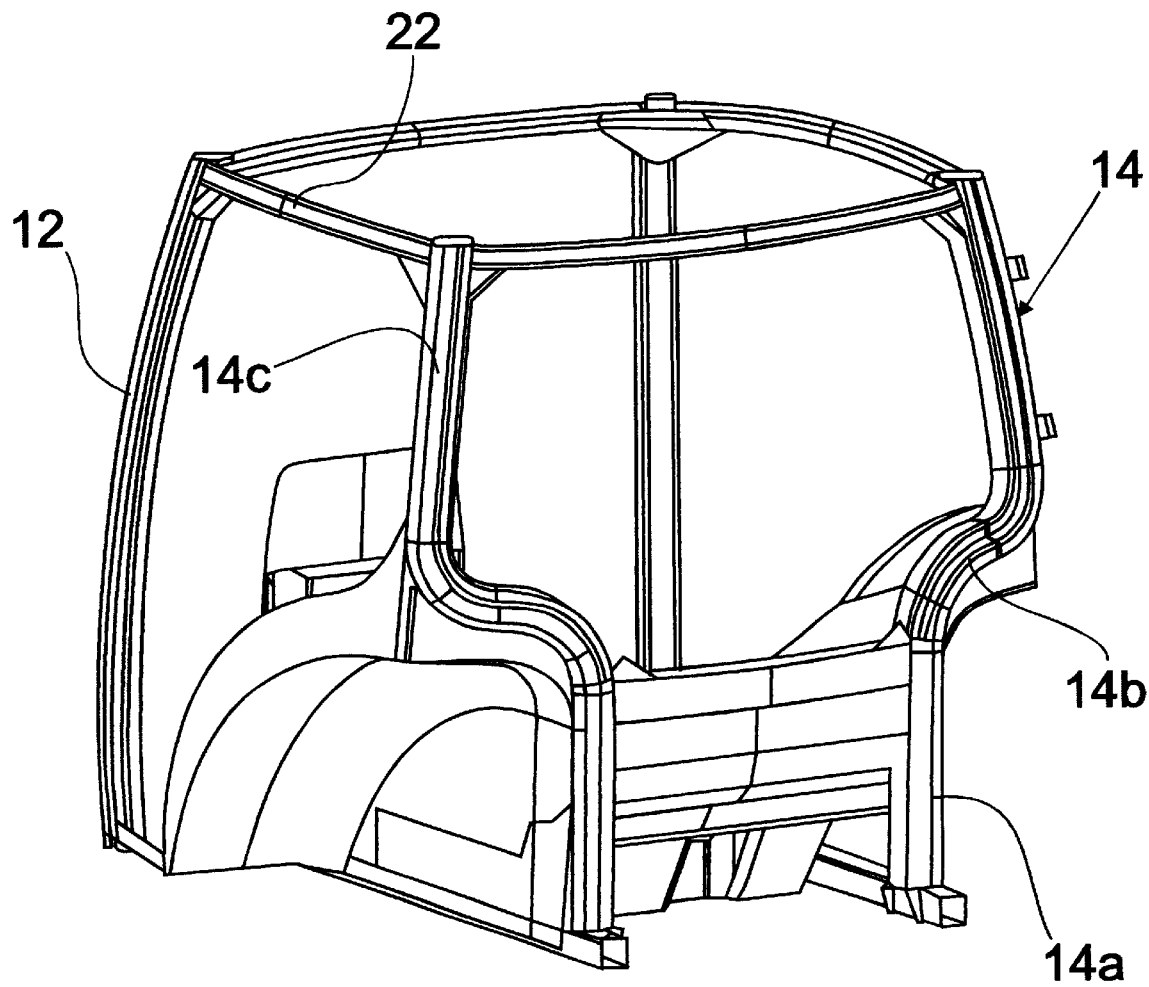
FIG. 5 is a rear left perspective of the cab frame incorporating the principles of the instant invention.

In the drawings, a cab 10 for an agricultural vehicle such as a tractor comprises two A-pillars 12 at the front corners of the cab and two C-pillars 14 at the rear corners. Two wheel arches or fenders 16 are incorporated into the cab 10 at its rear. When the cab is fully assembled, a roof is supported by the tops of the A-pillars 12 and C-pillars 14, a front windscreen is fitted between the two A-pillars 12 and a rear window is fitted between the upper portions of the two C-pillars 14. The floor or base of the cab os secured to the lower ends of the A-pillars 12 and the C-pillars 14. The sides of the cab are closed by doors that are taller at their front ends than at their rear ends so that they fit over the wheel fenders 16.

Within the cab, there is mounted a console unit 18 carrying the steering wheel and various controls of the tractor and these are accessed by an operator sitting in a seat 20 located between the two wheel fenders 16.

Each of the C-pillars 14 is formed of a tube that is bent, for example by hydroforming, to define a lower portion 14a arrange at the rear of the cab inwards of the rear wheel fenders 16 connected by a curved transition portion 14b to a curved upper portion 14c. The upper portions 14c lie above the wheel fenders 16 and are offset forwards from the rear of the cab relative to the lower portions 14a.

All the sides of the frame, namely the A-pillars 12, the upper portions 14c of the C-pillars 14 and roof members 22 interconnecting the upper ends of the pillars 12 and 14 are curved to be convex outwards, the pillars 12 and 14 running inwards from bottom to top. All the panels fitted to the frame, including the doors, the front windscreen and the rear window are correspondingly formed convex outwards. Aside from making for a more rigid cab, this design improves the aesthetics of the cab and the curved windows improve the operator's visibility.

The construction of the C-pillars 14 also achieves improved support of the rear window, the window being supported from below by the curved transition portion 14b of the pillars. Furthermore, the offsetting of the upper portions 14c forwards from the rear of the cab serves to improve rear visibility while reducing the width of doors to improve the strength of the cab.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A cab for an agricultural vehicle having front and rear corners and two rear wheel fenders arranged one on each side at the rear of the cab, comprising:
   a frame including two rear support members having lower portions disposed at the back of the cab between the two fenders, and upper portions disposed above the fenders and being offset laterally outwardly from the lower portions, each of said rear support members being formed from a tube that is bent to define a curved generally horizontal transition portion between the upper and lower portions of the rear support members.

2. The cab of claim 1 wherein the upper portions of the rear support members are additionally offset to lie forwardly of the lower portions of the rear support members at a distance from a rear portion of the cab.

3. The cab of claim 2 wherein the frame further includes:
   two front support members positioned at the front corners of the cab, said front support members and the upper portions of the rear support members being curved to run inwardly from the bottom to the top of the cab.

4. The cab of claim 3 wherein the horizontal transition section supports a window arranged at the rear,of the cab to extend between the upper sections of the rear support members.

5. In a cab for an agricultural vehicle having front and rear corners and two rear wheel fenders arranged one on each side at the rear of the cab, the improvement comprising:
   a frame including
      two rear support members having lower portions disposed at the back of the cab between the two fenders and upper portions disposed above the fenders and being offset laterally outwardly from the lower portions, and
      two front support members positioned at the front corners of the cab, said front support members and said upper portions of said rear support members being curved to be convex outwards.

6. The cab of claim 5, further comprising roof members interconnecting said upper portions of said rear support members and upper ends of said front support members, said roof members being curved to be convex outwards.

7. The cab of claim 5, wherein said upper portions of said-rear support members are additionally offset to lie forwardly of said lower portions of said rear support members at a distance from a rear portion of said cab.

8. The cab of claim 5, wherein each of said rear support members is formed from a tube that is bent to define a curved generally horizontal transition portion between said upper and lower portions of said rear support members.

9. The cab of claim 8, wherein said horizontal transition section supports a window arranged at the rear of the cab to extend between said upper sections of said rear support members.

\* \* \* \* \*